United States Patent
Yang

(10) Patent No.: US 10,901,517 B2
(45) Date of Patent: Jan. 26, 2021

(54) METHODS AND APPARATUSES FOR CONTROLLING A SYSTEM VIA A SENSOR

(71) Applicant: Atheer, Inc., Mountain View, CA (US)

(72) Inventor: Allen Yang Yang, Richmond, CA (US)

(73) Assignee: Atheer, Inc., Santa Clara, CA (US)

( * ) Notice: Subject to any disclaimer, the term of this patent is extended or adjusted under 35 U.S.C. 154(b) by 0 days.

(21) Appl. No.: 16/162,041

(22) Filed: Oct. 16, 2018

(65) Prior Publication Data

US 2019/0050065 A1  Feb. 14, 2019

Related U.S. Application Data

(63) Continuation of application No. 14/712,826, filed on May 14, 2015, now Pat. No. 10,133,356.

(60) Provisional application No. 62/010,966, filed on Jun. 11, 2014.

(51) Int. Cl.
| | |
|---|---|
| *G06F 3/01* | (2006.01) |
| *G02B 27/01* | (2006.01) |
| *G06T 7/00* | (2017.01) |
| *G06K 9/00* | (2006.01) |
| *G06K 9/03* | (2006.01) |

(52) U.S. Cl.
CPC ......... *G06F 3/017* (2013.01); *G02B 27/0172* (2013.01); *G06K 9/00201* (2013.01); *G06K 9/00355* (2013.01); *G06K 9/00543* (2013.01); *G06K 9/03* (2013.01); *G06T 7/0002* (2013.01); *G02B 2027/0178* (2013.01); *G06T 2207/10024* (2013.01); *G06T 2207/10028* (2013.01); *G06T 2207/30168* (2013.01)

(58) Field of Classification Search
CPC .......... G06F 3/017; G06F 3/013; G06F 3/016; G06F 3/011; G06F 3/01
See application file for complete search history.

(56) References Cited

U.S. PATENT DOCUMENTS

| | | | |
|---|---|---|---|
| 9,007,490 B1 | 4/2015 | Yuan et al. | |
| 9,857,919 B2 * | 1/2018 | Zhang | G06K 9/3233 |
| 10,133,356 B2 * | 11/2018 | Yang | G06K 9/03 |
| 2010/0066809 A1 * | 3/2010 | Cormack | H02J 7/025 348/36 |
| 2010/0164990 A1 * | 7/2010 | Van Doorn | G06F 3/14 345/633 |
| 2011/0310005 A1 * | 12/2011 | Chen | G06F 1/3262 345/156 |

(Continued)

*Primary Examiner* — Olga V Merkoulova
(74) *Attorney, Agent, or Firm* — Miller IP Law, LLC

(57) ABSTRACT

A method, system, apparatus, and/or device for sensing determining levels of an object to execute a command. The method, system, apparatus, and/or device may include: sensing an object that occupies a first portion of a field of view (FOV) of the sensor at a first point in time; determining a first saturation level of the object at the first portion of the FOV; sensing the object that occupies a second portion of the FOV of the sensor at a second point in time; determining a second saturation level of the object at the second portion of the FOV; determining that the first saturation level is different than the second saturation level; and in response to the first saturation level being different than the second saturation level, executing an executable command associated with the first saturation level and the second saturation level.

20 Claims, 7 Drawing Sheets

(56) References Cited

U.S. PATENT DOCUMENTS

| | | | |
|---|---|---|---|
| 2013/0127980 A1* | 5/2013 | Haddick | G06F 3/013 348/14.08 |
| 2013/0278631 A1 | 10/2013 | Border et al. | |
| 2013/0321675 A1* | 12/2013 | Cote | H04N 9/64 348/242 |
| 2015/0363000 A1* | 12/2015 | Yang | G06T 7/0002 345/156 |

* cited by examiner

METHODS AND APPARATUSES FOR CONTROLLING A SYSTEM VIA A SENSOR

CROSS-REFERENCE TO RELATED APPLICATION

This application is a continuation of U.S. patent application Ser. No. 14/712,826, filed May 14, 2015, which claims priority to benefit of U.S. Provisional Application No. 62/010,966, filed on Jun. 11, 2014, which are hereby incorporated by reference for all purposes.

BACKGROUND

Sensors may be used to acquire data that is analyzed in terms of content. For example, an image sensor may obtain an image, and that image then may be evaluated to detect features such as hand gestures. It may be possible to use data obtained in such fashion to control a system. A hand gesture captured by an imaging sensor may be used as a system input, e.g. to cause some processor command to be executed in response to the gesture, to control a device thereby, and so forth.

Such inputs may rely on gestures that are conveniently executed, distinct, "natural", etc. However, the use of such "natural" gestures in this fashion may pose problems. For example, multiple systems may rely on similar or identical natural gestures for conflicting purposes, e.g. one gesture (or two similar gestures) may be selected for different inputs by developers of an operating system and an application that runs under that operating system. This may produce confusion both for system users and within the system itself.

Furthermore, a gesture that is "natural" may be used without being intended as a system input. For example, hand motions associated with the manipulation of physical objects, hand motions made unconsciously during a conversation, etc. may be made incidentally rather than as input for entering commands, controlling systems, etc., and at least potentially may be interpreted erroneously as commands to a processing system.

BRIEF SUMMARY

The present embodiment contemplates a variety of systems, apparatus, methods, and paradigms for controlling a system via a sensor.

In one embodiment of the present embodiment, a machine-implemented method is provided that includes establishing a saturation profile in a processor including saturation of a sensor and establishing a saturation response in the processor including an executable instruction for the processor. The method includes sensing an input with the sensor, communicating the input to the processor, and comparing the input to the saturation profile in the processor. The method further includes, if the input satisfies the saturation profile, executing the saturation response in the processor.

The saturation profile may include at least one input feature in addition to the saturation.

The sensor may have a field of view. The saturation profile may include saturation of the sensor across at least a substantial portion of the field of view thereof. The saturation profile may include saturation of the sensor across substantially all of the field of view.

The saturation of the sensor may substantially correspond with the end effector.

The saturation of the sensor may substantially correspond with the maximum sensor value, the minimum sensor value, an invalid sensor value, an error sensor value, and/or a substantially uninformatively uniform sensor value.

The input may include an image. The input may substantially correspond with a hand covering substantially all of the field of view of the image with a minimum brightness. The saturation of the sensor may substantially correspond with maximum brightness, minimum brightness, maximum color channel brightness, minimum color channel brightness, substantially uninformatively uniform brightness, substantially uninformatively uniform color channel brightness, invalid brightness, invalid color brightness, error brightness, and/or error color brightness.

The input may include a depth image. The input may substantially correspond with a hand covering substantially all of the field of view of the depth image with a minimum depth. The saturation of the sensor may substantially correspond maximum depth, minimum depth, substantially uninformatively uniform depth, invalid depth, and/or error depth.

The input may include depth data. The saturation of the sensor may substantially correspond with maximum depth, minimum depth, substantially uninformatively uniform depth, invalid depth, and/or error depth.

The input may include audio data. The saturation of the sensor may substantially correspond with maximum volume, minimum volume, maximum frequency volume, minimum frequency volume, substantially uninformatively uniform frequency distribution, invalid input, and/or error input.

The input may include thermal data, ultrasonic data, time of flight data, stereo depth data, focal depth data, accelerometer data, gyroscope data, electrical data, and/or magnetic data.

The saturation profile may include a posture of an end effector and/or a gesture of the end effector. The end effector may be a hand. The posture and/or gesture may include the plane of the hand being substantially flat to the field of view of the sensor. The saturation of the sensor may include the end effector being disposed so as to fill substantially all of the field of view.

The executable instruction may include a system command for the processor. The executable instruction may include a system interface command. The executable instruction may include a "go back" command, wherein the system substantially returns the state of the interface to a previous state of the interface.

The saturation profile may include a gesture terminating in the saturation of the sensor. The gesture may include a hand in a field of view of the sensor, the plane of the hand being substantially flat to the field of view, the fingers of the hand being substantially extended and at least partially spread. The saturation of the sensor may include the hand being disposed so as to fill substantially all of the field of view.

The saturation profile may include a gesture originating in the saturation of the sensor. The gesture may include a hand in the field of view of the sensor, the plane of the hand being substantially flat to the field of view, the fingers of the hand being substantially extended and at least partially spread. The saturation of the sensor may include the hand being disposed so as to fill substantially all of the field of view.

The saturation profile may include a gesture with the saturation of the sensor intermediate therein. The gesture may include a hand in the field of view of the sensor, the plane of the hand being substantially flat to the field of view, the fingers of the hand being substantially extended and at least partially spread. The saturation of the sensor may include the hand being disposed so as to fill substantially all of the field of view.

In another embodiment of the present embodiment, an apparatus is provided that includes means for establishing a saturation profile comprising saturation in an input, and means for establishing a saturation response. The apparatus includes means for sensing the input, means for comparing the input to the saturation profile, and means for executing the saturation response if the input satisfies the saturation profile.

In another embodiment of the present embodiment, an apparatus is provided that includes a sensor and a processor in communication with the sensor. The apparatus includes a saturation profile instantiated on the processor and a saturation response instantiated on the processor. The apparatus also includes a saturation profile comparer instantiated on the processor and adapted to compare an input from the sensor with the saturation profile so as to determine whether the input satisfies the saturation profile. The apparatus further includes a saturation response executor instantiated on the processor and adapted to execute the saturation response if the input satisfies the saturation profile.

The sensor and processor may be disposed on a head-mounted display.

The sensor may include an imager, a stereo image pair, a depth imager, a depth sensor, an audio sensor, an ultrasonic sensor, a thermal sensor, a time of flight sensor, a focal depth sensor, an accelerometer, a gyroscope, an electrical sensor, and/or a magnetic sensor.

BRIEF DESCRIPTION OF THE DRAWINGS

Like reference numbers generally indicate corresponding elements in the figures.

DETAILED DESCRIPTION

Figure 1A:
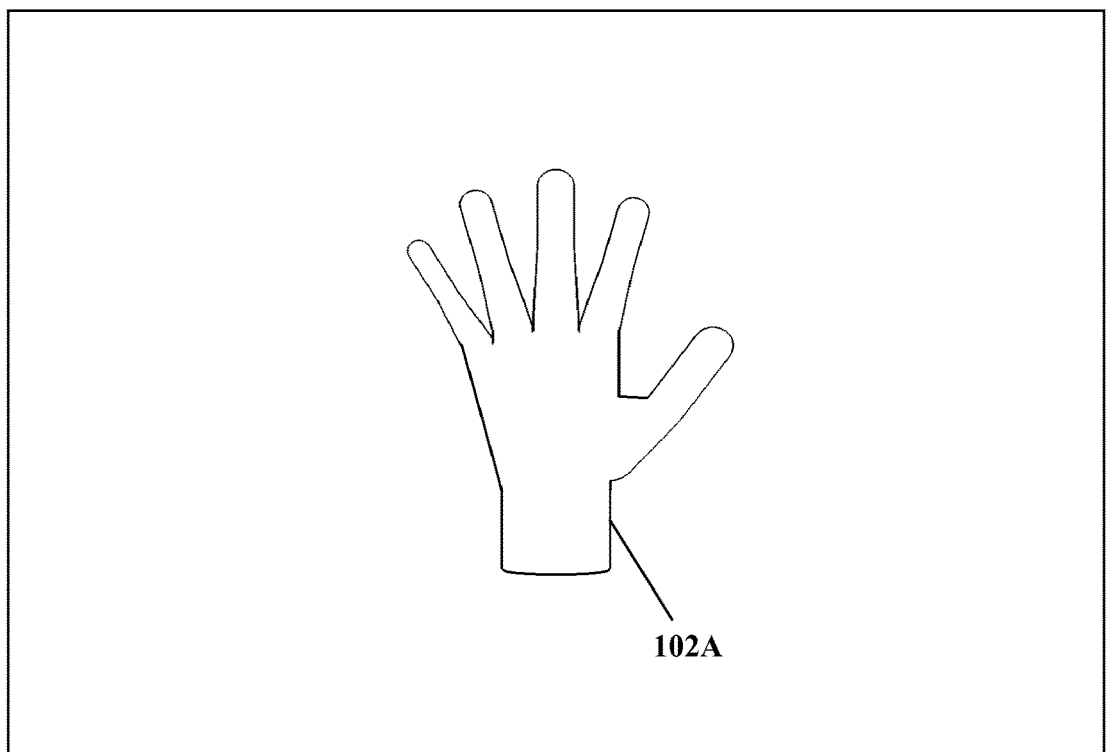
FIG. 1A shows an example field of view in comparison to a hand.

Referring to FIG. 1A, therein a hand 102A is shown in outline form. A rectangular outline representative of a field of view 104A is shown to represent the field of view of a sensor, such as a camera, depth sensor, etc. As may be seen, in the configuration shown in FIG. 1A the hand 102A occupies only a portion of the field of view 104A. A sensor with such a field of view 104A thus typically may distinguish and/or identify the presence of the hand 102A, distinguish and/or identify postures of the hand 102A, distinguish and/or identify gestures executed by the hand 102A, etc.

Figure 1B:
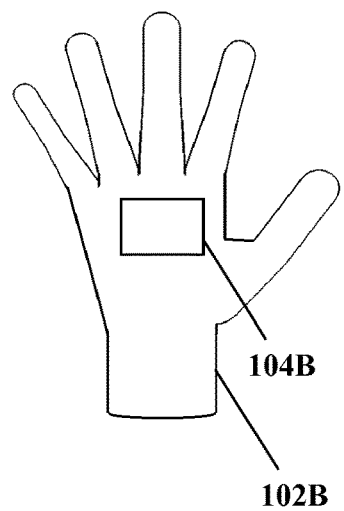
FIG. 1B shows another example field of view in comparison to a hand, with the hand substantially completely filling the field of view.

Turning to FIG. 1B, therein a hand 102B is again shown in outline form, and a rectangular outline representative of a field of view 104B is again shown to represent the field of view of a sensor sensing (or at least adapted to sense) that hand 102B. As may be seen in the configuration shown in FIG. 1B the hand 102B occupies the entire field of view 104B. A sensor with such a field of view 104B may be unable to distinguish and/or identify the hand 102B, distinguish and/or identify postures of the hand 102B, distinguish and/or identify gestures executed by the hand 102B, etc., or at least such actions may be problematic. Rather, such a sensor typically would sense a substantially undistinguished data set throughout the field of view 104B; while that data set may indeed represent the hand 102B, the data set may not be sufficient as to enable determining even that the hand is present, much less the posture/gesture of the hand, etc.

An arrangement such as that in FIG. 1A may occur when a sensor is at some significant distance from a hand 102A (or other entity), the distance being suitable as to facilitate discrimination of the hand by a sensor. In colloquial terms, the contents of the field of view 104A are such that the sensor would be able to tell that a hand 102A was present. More precisely, interpretation of the sensor input from the sensor, for example in a processor, may be enabled.

By contrast, an arrangement such as that in FIG. 1B may occur when a sensor is so close to a hand 102B (or other entity) that the field of view 104B does not encompass enough of the hand 102B to enable discrimination thereof. Even if some features could be detected or identified, e.g. skin color, depth map, etc., identification of the hand 102B on the basis of what is sensed may not be feasible, or may even be impossible. It may be considered that for the arrangement in FIG. 1B the input available to and/or provided by an image sensor may no longer be a useful image (and arguably may not be an "image" at all in certain strict senses, i.e. is an all-black or all-white "image" an image of anything?), or at least no longer may be an image of the hand 102B in the sense of the hand 102B being recognizable therefrom.

In terms of the sensor itself, in practice for certain targets such as a hand the sensor may be considered to be saturated, or at least substantially saturated, for arrangements such as that shown in FIG. 1B. For example, a camera may be nearly or entirely "blacked out" by the hand 102B throughout all or nearly all of the field of view 104B, while a depth mapping sensor may read zero or near-zero distance (or potential errors or some other such "value") across the entirety of the field of view. Although such conditions do not necessarily represent "all black" input and may include for example all (or substantially all) white, error, zero or one (for binary systems), etc., it may be convenient to address such an input as a "blackout".

Such a "blackout" also may be referred to as a form of sensor saturation. Indeed, for at least certain sensors such a blackout may in practice include saturation of the sensor elements, e.g. an all-white image may set all elements of a CCD to their maximum charge status. However, physical saturation is not necessarily required, and the present embodiment is not limited only to arrangements where physical saturation is present.

To more fully understand sensor saturation, consider an arrangement of a black-and-white digital camera, each pixel in an image might have a brightness value ranging from 0 (black, or the minimum input that can be sensed) to 255 (white, the maximum input that can be sensed). When the sensor is fully blacked out (e.g. if fully obstructed by a hand) the sensor detects values that are at or at least substantially at 0 across substantially all or all of the field of view, and the sensor may be referred to as being "saturated low" in terms of image brightness.

When a sensor's field of view (or some portion thereof) is saturated in such fashion, whether high or low (maximum value or minimum value), what the sensor reports may no longer be an "image" in practical terms. That is, while outputting "0 brightness at all pixels" might be argued to still technically constitute delivering data, an all-0-brightness return isn't an image of anything.

While an all-0-brightness image is used as an example, other possibilities exist for sensor saturation. For the same sensor as that presented as an example above, an all-255-brightness return (sometimes referred to as a "white out" or "burn out") likewise may represent saturation. For color imaging sensors, e.g. sensors with multiple color channels (rather than a single black-to-white channel as in the example above), substantially maximum or substantially minimum values in one or more color channels across a substantial portion of the field of view might constitute saturation.

Furthermore, even if sensors are not necessarily at maximum or minimum values (black or white, full blue or zero blue, etc.), saturation still may be considered to occur if substantially the entire field of view is at least substantially non-distinguishable. For example, if a field of view is saturated with a particular flesh tone or even a range of flesh tones, so as to provide inadequate information to distinguish (in this example) hand features, the sensor and/or image still may be considered to be saturated for at least certain embodiments of the present embodiment. That is, even if sensor input is not a maximum value, minimum value, or an invalid or error sensor value, sensor values that are sufficiently uniform or undistinguished as to be substantially uninformative (e.g. being insufficient to discriminate content thereof) still may be considered as saturation, and utilized thereas according to the present embodiment.

In addition, although black-and-white and color imaging sensors are referenced above for simplicity, different sensors may exhibit different forms of saturation. For example, consider a depth camera such as one that produces a two-dimensional image of depths or distances between sensor and subject matter, e.g. by measuring time-of-flight. In an arrangement similar to that shown in FIG. 1B, where a hand 102B is so close to a sensor as to substantially fully obstruct the field of view 104B, the distance from the sensor to hand 102B might be so short as to be unmeasurable by the sensor. This might produce an all-0-distance return, however, for certain sensors and under certain conditions, the sensor might fault rather than returning data (even 0-distance data). That is, the sensor may generate an image wherein the pixels have no distance data at all (as opposed to indicating 0 distance). Alternately, certain sensors may, due to the particulars of their design, construction, programming, etc., return values that are nonsense or physically impossible, such as a value of −1 for distance.

The particulars of what constitutes a saturation response will vary with sensors, applications, etc. Thus while substantially minimum return, substantially maximum return, and fault returns are presented herein as examples, it should be understood that other saturation states may also exist and fall within the scope of the present embodiment.

Regardless of the particular form or nature of sensor saturation, sensor saturation may in some sense be considered a "non-response" from the sensor. Though the sensor may be physically functional and may deliver input (e.g. to a processor, a display, etc.), the data, state, etc. being delivered by the sensor conventionally may be ignored as not useful.

However, even though a saturated sensor may not enable distinguishing an image (e.g. sensing a hand and/or identifying gestures/postures) in the arrangement of FIG. 1B, the saturated sensor state nevertheless may be utilized as useful input according to the present embodiment. The fact of the sensor saturation, and/or the particulars of the sensor saturation (e.g. saturated black, saturated with a specific color or color range, saturated with distance faults, etc.) may be interpreted as an indication of some state, event, etc. For the example arrangement shown in FIG. 1B, sensor saturation may be interpreted as an indication that a hand 102B has approached the sensor to a distance such that the field of view 104B is substantially filled and the sensor input is saturated by the input received from the hand 102B Likewise, circumstances of the sensor saturation also may be interpreted usefully according to the present embodiment. For example, if previous input from the sensor showed a hand 102B approaching the sensor, this also may be used to interpret the sensor saturation as being representative of the hand 102B having closely approached the sensor to the point of sensor saturation.

A saturation event thus may be utilized as an input according to the present embodiment, for example for a system engaged with the sensor, such as a processor, even if the sensor is producing no distinguishable images.

Reference to image and/or image sensors is an example only, and other arrangements may be equally suitable; the present embodiment is not necessarily limited only to images and/or image sensors. For example, saturation of audio sensors with the noise of high volume, low volume, uniform pitch, indistinguishably uniform content (i.e. "white noise"), and so forth also may be suitable for certain embodiments of the present embodiment. As a more concrete example, tapping a microphone or other audio sensor may produce a temporary saturated-high state, that is, the microphone may read maximum (or at least high) input due to the tap. Conversely, covering a microphone so as to partially or entirely muffle sound incoming thereto may produce a saturated-low state, wherein the microphone may read zero/minimum (or at least low) input thereby. Furthermore, noises produced without necessarily physically interacting with an audio sensor also may produce saturation, for example by clapping, snapping fingers, slapping one's forehead with an open palm, etc. to yield a saturated-high state in the audio sensor.

A thermal sensor may be saturated by covering that sensor with a hand, in a manner potentially similar to the approaches described already with regard to image sensors. Whatever the temperature of the hand (typically though not necessarily high), covering a thermal sensor therewith may produce a saturated state with the thermal sensor at maximum or high levels, a saturated state with the thermal sensor detecting thermal information sufficiently uniform as to be uninformative, etc.

Other sensors also may be suitable for use with the present embodiment, including but not limited to distance sensors (such as ultrasonic sensors, time of flight sensors, stereo depth sensors, focal depth sensors, depth cameras, etc.), motion sensors (such as accelerometers, gyroscopes, etc.), and electrical and/or magnetic sensors. Other sensors, and/or other saturation states, may be equally suitable. In addition, the particulars of what saturation states may be attained for a given embodiment may depend at least in part on the sensor(s) associated with those embodiments, and saturation states other than those described herein also may be equally suitable.

For an arrangement wherein postures and/or gestures are used as input, and with sensor saturation utilized as input as described with regard to FIG. 1A and FIG. 1B, "saturating the sensor" may be considered to be a posture or gesture (or if not then potentially at least some other form of user input). For example, a gesture that incorporates sensor saturation may begin with a hand arranged with the palm flat to/facing the sensor and with the fingers extended and spread, and transition to saturation by moving the hand (and/or by moving the sensor) sufficiently close to the sensor that the sensor input is saturated. FIG. 1A and FIG. 1B may be viewed as a simple saturation gesture conforming to this example description.

Consideration of sensor saturation with regard to inputs including but not limited to posture/gesture inputs according to the present embodiment may exhibit advantages. For example, although moving a hand to saturate a sensor (e.g. moving a hand to cover the lens of an imaging sensor) may be a convenient and in at least some sense a "natural" movement to execute, such a motion may not be characteristic of gestures used for non-input purposes (e.g. for emphasis in casual conversation). More colloquially, a user who is not wearing a camera generally does not carry out motions so as to saturate the input of a nonexistent camera (thus such saturation gestures may not have common equivalents in typical person-to-person communication gestures, etc.). More concretely, considering as an example a head-mounted display in the form of a pair of glasses having cameras to either side, moving to obstruct one or both cameras with a hand may not have an unconscious or casual analog, since absent the cameras such motions may serve no purpose.

By contrast, a person in conversation may gesture, perhaps without even being aware of gesturing. Similarly, certain common deliberate gestures relating to grabbing, manipulating, and moving objects, while potentially useful as inputs, are frequently carried out for purposes other than delivering an input to a system (e.g. in order to interact with objects in the physical world). If such postures/gestures are sensed by sensors, such gestures may be interpreted by a system as inputs/commands regardless of the intent of the person making those postures/gestures. Such events may be referred to as "false positives"; the system receives and/or reacts to a command that the user did not intend to give.

Thus one advantage of saturation-linked postures and/or gestures may be a resistance to false positives, insofar as users may be unlikely to execute saturation-linked postures/gestures unconsciously or for alternative purposes.

Another potential advantage of saturation-linked inputs according to the present embodiment may be that multiple variants of postures and/or gestures may be available. For example, substantially any hand position and/or motion (or a position/motion of other end effectors, such as a pen, a stylus, etc.), and/or other input (audio, etc.) may be combined with sensor saturation. Moving a hand 102A with fingers extended and spread from a position where the hand 102A may be distinguished by a sensor as in FIG. 1A into a position where the hand 102B saturates a sensor as in FIG. 1B may be suitable for use as a saturation-linked gesture; however, the reverse—beginning by saturating the sensor and then moving away—also may be suitable. Likewise, gestures that begin and end with saturation, that have saturation as a middle step, etc. likewise may be suitable. Furthermore, a wide variety of hand configurations and/or motions may be suitable for portions of a gesture wherein the hand can be distinguished by the sensor, e.g. a closed fist, an extended index finger, a "Vulcan salute", etc.

By contrast, a significant number of non-saturating gestures that may be potentially suitable as inputs may be "off-limits" due to issues of confusion as noted above. For example, as noted above interpreting a grabbing gesture as a system input (e.g. grabbing a virtual object) may be problematic since such a grabbing gesture also may be made when a user is actually grabbing a physical object.

It is noted that although different causes may produce sensor saturation, not all sensor saturations are necessarily equivalent. A sensor saturation produced by holding a hand in front of a camera may be distinguishable from a sensor saturation wherein hair or a hat blocks a camera, for example by color or other parameters. In addition, a saturation-linked gesture wherein saturation is to be followed by a particular hand configuration (or stylus gesture, or other end-effector configuration, etc.) may be unlikely to be misinterpreted; unless an unintended sensor saturation were followed by the user coincidentally performing the right-hand configuration at the right time, the full gesture would not have been performed, so a spurious system command may not have been executed.

Thus saturation does not in itself necessarily also introduce additional false positives, and indeed in at least certain instances may contribute to avoiding false positives.

Figure 1C:
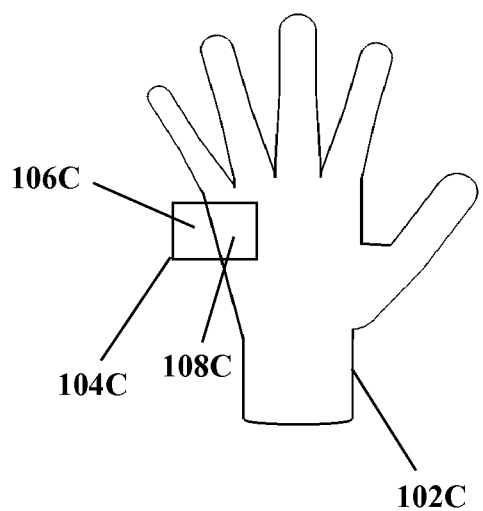
FIG. 1C shows another example field of view in comparison to a hand, with the hand filling a substantial portion of the field of view.

Now with reference to FIG. 1C, sensor saturation may manifest for only a portion of a sensor field of view; saturation is not limited only to full-field-of-view effects, nor is the present embodiment limited only to full-field-of-view sensor saturation.

As may be seen in FIG. 1C, a hand 102C is again shown in outline form, and a rectangular outline representative of a field of view 104C is again shown to represent the field of view of a sensor sensing the hand 102C (and potentially delivering sensor input to a processor, etc.). Although the relative sizes of the hand 102C and field of view 104C are similar to those in FIG. 1B, in FIG. 1C the hand 102C occupies only a portion of the field of view 104C. For such an arrangement it may be useful to distinguish two regions within the field of view 104C: a first region 106C of the field of view that is not saturated (or at least is not saturated by the hand 102C; background conditions may in certain circumstances cause saturation, e.g. direct sunlight for an image sensor, but such issues are not represented or considered to be present in FIG. 1C for purposes of simplicity), and a second region 108C of the field of view that is saturated. Such an arrangement typically may result in the sensor sensing a substantially undistinguished data set throughout the second region 108C, and (potentially) a distinguishable ("normal") data set in the first region 106C.

An arrangement such as that in FIG. 1C might occur when a sensor is so close to a hand 102C (or other entity) as to partially cover the sensor, leaving the second region 108C of the field of view 104C incapable of discriminating the hand while the first region 106C may still capture information normally.

Figure 2:
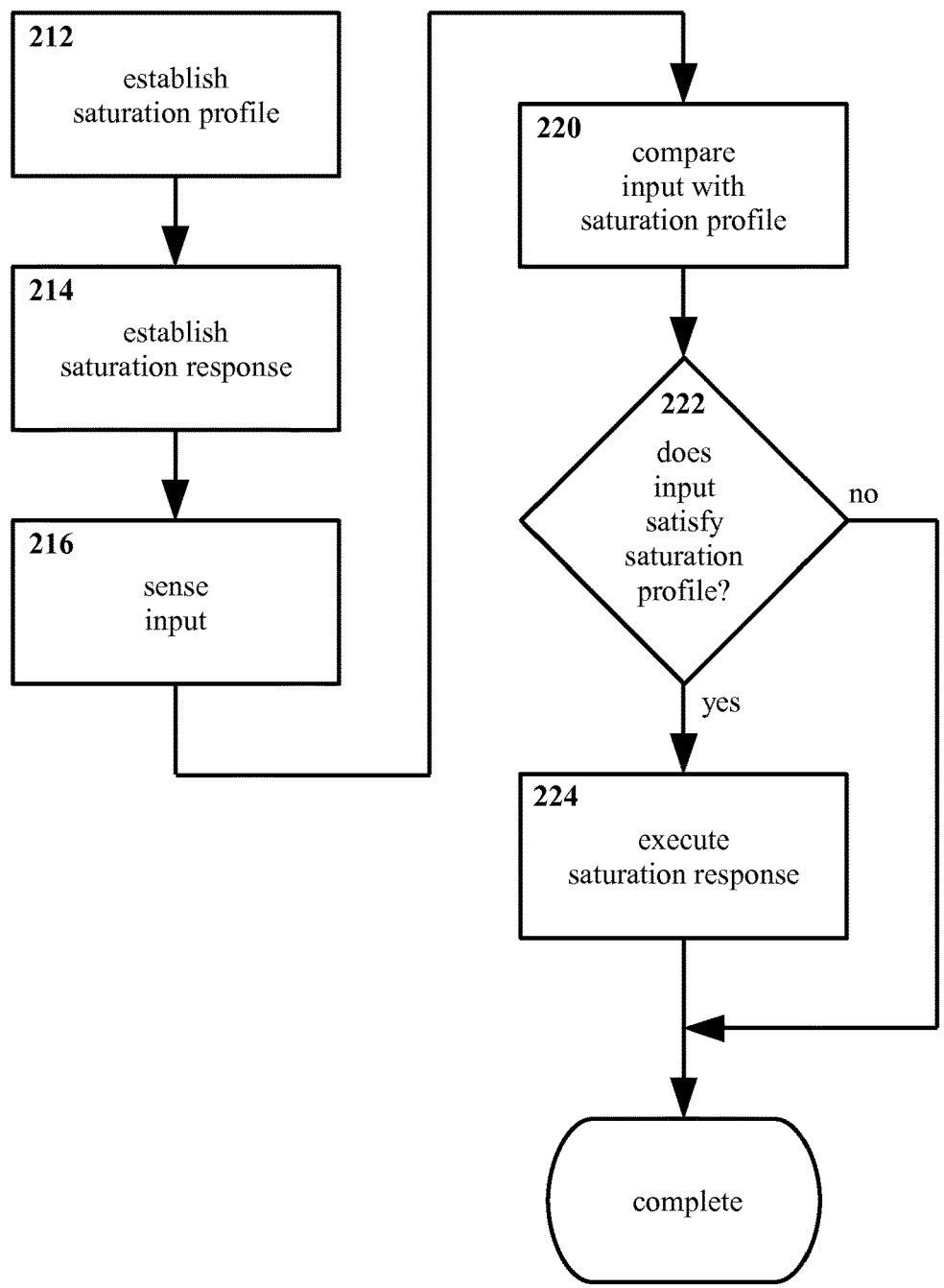
FIG. 2 shows an example method for delivering input to a system according to the present embodiment, in flow-chart form.

Turning now to FIG. 2, therein is shown an example method for controlling a system according to the present embodiment, in flow-chart form. In the example shown in FIG. 2, a saturation profile is established at step 212. Typically but not necessarily, the saturation profile may be established as data and/or executable instructions instantiated on a processor, and/or stored so as to be accessible to the processor. The saturation profile may be understood to define and/or describe what constitutes sensor saturation.

For example, a saturation profile might specify that at least 95% of the field of view must exhibit 0% to 2% brightness, i.e. a substantial black-out in substantially the full field-of-view. Alternately, a saturation profile might specify that at least 20% of the field of view must exhibit depth fault returns, i.e. a partial depth sensor black-out. Saturation profiles may also include additional factors, for example, a requirement that regions (e.g. the 95% and 20% above) be contiguous, have a certain shape, have well-defined borders, etc.

The specifics of the saturation profile may vary depending on a variety of factors, including but not limited to the type and performance of the sensor (e.g. a black-and-white camera typically will not have restrictions regarding color) and the types of inputs that are expected to produce saturation (e.g. black-out saturation by placing a hand in front of a depth sensor may be expected to generate a sensor feed that is different from white-out saturation by illuminating an image sensor with an LED on a stylus, etc.). Choices for different embodiments also may affect the details of the saturation profile, for example, a saturation profile for a sensor on a head-mounted display might be defined to exclude saturation by the hair, hats, etc.

In addition, as noted above saturation-linked postures and/or gestures may include inputs other than the saturation itself, such as hand configurations/motions before and/or after saturation. The saturation profile thus may be defined so as to include non-saturation information, such as images of hand postures and/or gestures, and/or other inputs.

Furthermore, the saturation profile may be conditional, with different requirements for different conditions. For example, considering an arrangement wherein the present embodiment is implemented in a head-mounted display, a saturation profile may be defined with a requirement that the head-mounted display must be worn (perhaps as determined through sensor input), and that the saturation profile would not be satisfied under any conditions (or under very limited conditions) if the head-mounted display is not worn. For such an arrangement, placing the head-mounted display inside a pocket, purse, etc. would not then necessarily trigger an unwanted command due to sensor saturation.

The present embodiment is not particularly limited with regard to the saturation profile, and other arrangements than those examples described may be equally suitable.

Typically though not necessarily, the saturation profile may be established in a processor. In such embodiments, the present embodiment is not limited with regard to the processor. A range of general-purpose, special-purpose, and embedded systems may be suitable for use as a processor for the present embodiment. Moreover, it may be equally suitable for the processor to consist of two or more physical or logical processor components, or to be a "virtual" processor. Other arrangements also may be equally suitable.

With regard in particular to the term "establishing", establishing the saturation profile is to be understood broadly with regard to the present embodiment. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a saturation profile may encompass several potential approaches, including but not limited to the following.

Establishing a saturation profile may include acquiring an existing saturation profile from some source, e.g. a data store such as a hard drive or solid state drive, a communicator such as a wired or wireless modem, information stored in and/or with a sensor (e.g. calibration profiles in read-only memory that may include "fault" conditions for a fault saturation), etc.

Establishing a saturation profile also may include creating or calculating the saturation profile, e.g. a processor may execute instructions so as to determine a saturation profile computationally, for example considering the type of sensor, previous sensor input, etc.

Some combination of the above approaches for establishing a saturation profile, and/or alternate approaches, may be equally suitable. The present embodiment is not limited insofar as how a position may be established. So long as a saturation profile is in some manner made available for the necessary functions thereof, any approach for establishing the saturation profile may be suitable.

Similarly, the establishing of other features according to the present embodiment (e.g. a saturation response) likewise should be understood broadly, and the present embodiment is not particularly limited with regard to the manner in which those features may be established unless otherwise specified herein.

Continuing in FIG. 2, a saturation response is also established at step 214. Typically but not necessarily, the saturation response is established as data and/or executable instructions instantiated on a processor, and/or stored so as to be accessible to the processor. The saturation response defines and/or specifies actions that may be taken by the processor (and potentially by other entities in communication with the processor) in response to saturation.

For example, a saturation response may include the processor executing some system command, performing some action within a user interface, etc. A saturation response may be defined as a fixed response, e.g. a "go back" command that substantially returns a user interface to a previous state or condition at substantially any time and/or under substantially any conditions. However, the saturation response also may be defined conditionally, such that different responses are executed depending on differing conditions, e.g. "go back" under certain circumstances, "help menu" under other circumstances, etc.

The present embodiment is not limited with regard to the saturation response, and other arrangements than those examples described may be equally suitable.

Still, with reference to FIG. 2, the input is sensed in step 216. Input includes (but is not necessarily limited to) information that enables determination of saturation, such as an image, video, depth map, etc. The present embodiment is not limited with regard to what form the input may take or how the input is sensed. Typically though not necessarily, the input may be sensed by a physical sensor proximate and/or integrated with the processor, such as a camera, depth camera, ultrasonic system, or other imager disposed on an electronic device with a processor therein, such as a head-mounted display. However, this is an example only, and the sensor is not required to be either integrated with or proximate the processor.

The present embodiment also is not limited with regard to the sensor, and a range of devices may be suitable for use as a sensor for the present embodiment. In certain examples presented herein the sensor is an imaging sensor, adapted to obtain still images and/or video. Suitable imaging sensors may include but are not limited to digital CMOS and CCD cameras. However, other sensors, including but not limited to depth sensors, ultrasound sensors, and sensors that capture information other than images and/or video may be equally suitable.

Continuing in FIG. 2, the processor compares the sensor input to the saturation profile at step 220. That is, information sensed by the sensor (in step 216) is compared at step 220 with the condition(s) established for the saturation profile (in step 212).

Based on the comparison of sensor feed and saturation profile in step 220, a determination is made at step 222 as to whether the sensor feed satisfies the saturation profile. If the determination is positive—if the sensor feed does satisfy the saturation profile—then the method continues with step 224 (below). If the determination is negative—if the sensor feed does not satisfy the saturation profile—then the method skips step 224.

Continuing in FIG. 2, for instances wherein the determination at step 222 is positive, the saturation response is executed at step 224. That is, the action(s) defined/specified in step 214 are carried out, typically though not necessarily by transmitting data from/through the processor, executing executable instructions in the processor, sending instructions to some device or system in communication with the processor, etc.

Although FIG. 2 shows the method therein as being complete following step 224 (if the comparison is positive, or step 222 if the comparison is negative), it is emphasized that the method in FIG. 2 is an example only. Other steps, other functions, etc. may be incorporated into the method, and/or other methods may be executed in combination with the method according to the present embodiment. In addition, for at least certain embodiments at least some portion of the method may repeat, e.g. in an ongoing loop that continues to determine whether the saturation profile is satisfied by the sensor feed. This likewise applies to other methods shown and described herein.

It is noted that as shown in FIG. 2, a method according to the present embodiment includes executing a saturation response if the saturation profile is satisfied by the input. That is, the present embodiment is not merely directed to the existence of saturation as a phenomenon, nor to the sensing of saturation, nor even to determine whether saturation is present or meets some standard. Rather, the present embodiment carries out some positive action in response thereto. Moreover, that positive response may perform some useful function, such as issuing a system command to control a device. It is emphasized that according to the present embodiment, sensor saturation is not merely considered as "waste" or as a problem, or even ignored as non-input, but rather sensor saturation is applied to serve as a form of useful input in and of itself.

Figure 3:
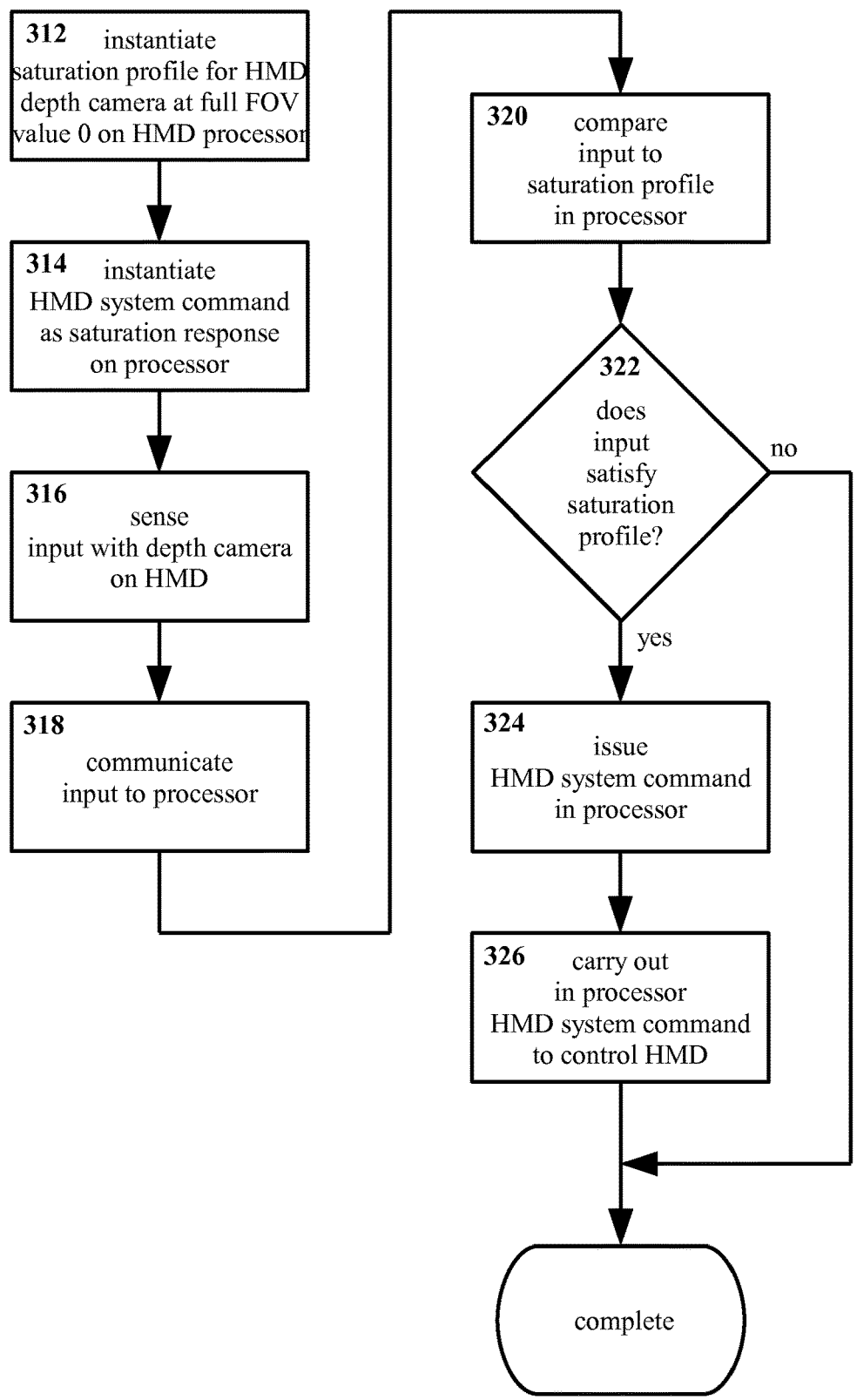
FIG. 3 shows another example method for delivering input to a system according to the present embodiment, with reference to a head-mounted display, in flow-chart form.

Now with reference to FIG. 3, where FIG. 2 presented a relatively general description of a method according to the present embodiment, FIG. 3 describes a more concrete example. Notably, FIG. 3 refers specially to a wearable electronic device that may be described as a head-mounted display or HMD, and to elements and functions thereof. The arrangement of FIG. 3 is an example only; the present embodiment is not limited only to head-mounted displays, and other arrangements than those shown in FIG. 3 may be equally suitable.

In the example arrangement of FIG. 3, a saturation profile is instantiated at step 312 onto the processor of an HMD. The saturation profile is adapted to address input from a depth camera disposed on the HMD, with the saturation profile specifying that the full field of view (FOV) of the depth camera should exhibit a distance value of 0.

Moving on in FIG. 3, an HMD system command is instantiated at step 314 on the HMD processor as a saturation response. That is, some command is specified to be issued by the processor, in the event that the saturation profile is satisfied by sensor input. For the example shown, wherein the processor is disposed within an HMD, the command might address some other physical element of the HMD, such as instructing a change to the output of a display screen. For the purposes of the example arrangement in FIG. 3, the system command is considered to be a command executed by the processor that controls some physical system and/or behavior of the HMD itself. Thus, the method shown in FIG. 3 represents a method of controlling an electronic device. However, this is an example only, and other arrangements also may be suitable, including but not limited to commands addressing an operating system on the HMD processor, programs on the HMD processor, an external system in communication with the HMD, etc. Furthermore, commands controlling other devices and/or systems (electronic or otherwise) besides an HMD, and commands not necessarily controlling a device or system, may be equally suitable.

Input is sensed at step 316 with the depth camera disposed on the HMD. For a depth camera, typically though not necessarily such input may be a depth map or depth image, a two-dimensional array of pixels wherein each pixel thereof has a depth or distance associated therewith (analogous to the color values associated with pixels in a color digital image). However, other arrangements may be equally suitable.

The input is communicated at step 318 to the processor. (It is noted that in FIG. 2, wherein certain steps were not necessarily specified as taking place within a processor, nor input to have come from a sensor, the notion of communicating may be considered implied, given that the method is not limited to a specific source or destination between which communication would pass. Thus, no explicit analog of step 318 appears in FIG. 2.) For an HMD with the processor and sensor both disposed therein, communication may take place along a direct wired link. However, this is an example only, other arrangements for communication may be equally suitable, and the present embodiment is not limited with regard thereto.

Still, with reference to FIG. 3, the input is compared at step 320 within the processor against the saturation profile. Typically though not necessarily the comparison may be carried out by executable instructions instantiated on the processor, though other arrangements may be suitable.

A determination is made at step 322, based on the comparison at step 320, as to whether the saturation profile is satisfied by the sensor input. For the specific example of FIG. 3, the determination may be stated as: does the depth image (sensor input from step 316) exhibit zero distance for the pixels thereof, across the full field of view of the sensor (as established in step 312)? If so, then the method proceeds to steps 324 and 326. If not, then the method skips steps 324 and 326.

If the determination at step 322 is positive, then the HMD system command is issued at step 324 by the processor (that command having been defined as a saturation response in step 314). Moving on in FIG. 3, whatever system command is issued at step 324 by the processor is carried out within the HMD, so as to control the HMD. As noted, such a command may control screen outputs, program or operating system functions, etc., and the present embodiment is not limited with regard thereto.

Figure 4:
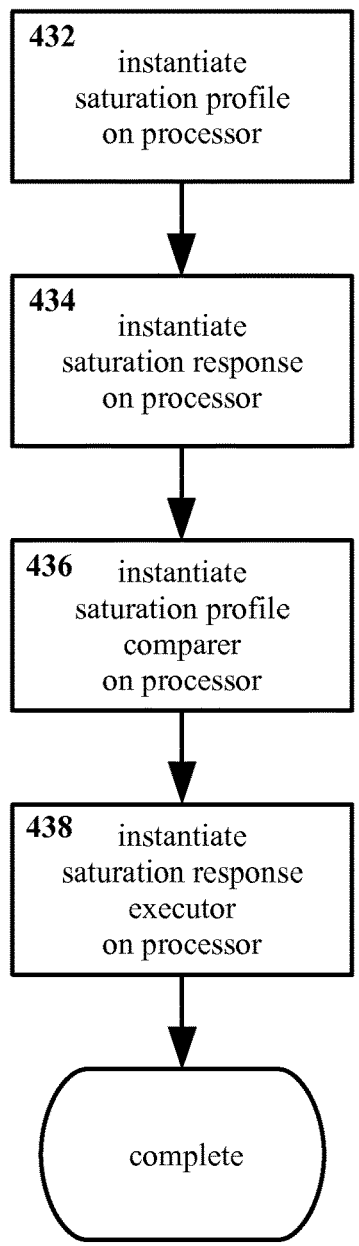
FIG. 4 shows an example method for implementing steps for delivering input to a system according to the present embodiment onto a processor, in flow-chart form.

Turning to FIG. 4, therein is shown an example method for disposing onto a processor an arrangement for carrying out a method for controlling a system according to the present embodiment, in flow-chart form. For the purposes of FIG. 4, it is presumed that a sensor adapted to sense input according to the present embodiment is in communication with the processor, so as to enable functions utilizing such a sensor (e.g. sensing input for a determination as to whether that input exhibits saturation).

In the method of FIG. 4, a saturation profile is instantiated at step 432 onto the processor. Saturation profiles according to the present embodiment have been described previously herein. A saturation response is instantiated at step 434 onto the processor. Saturation responses according to the present embodiment also have been described previously herein.

A saturation profile comparer is instantiated at step 436 on the processor. The saturation profile comparer is adapted to compare a sensor input that may be received in the processor (e.g. from the sensor) with the saturation profile instantiated at step 432 on the processor. Typically though not necessarily the saturation profile comparer includes executable instructions. However, other arrangements may be equally suitable, including but not limited to a saturation profile comparer that includes independent dedicated hardware (though in such instances the saturation profile comparer may be placed in communication with the processor rather than being instantiated thereon). Comparison of a sensor feed with a saturation profile has been previously described herein.

A saturation response executor is instantiated at step 438 on the processor. The saturation response executor is adapted to execute the saturation response if the saturation profile comparer determines that the sensor input satisfies the saturation profile instantiated at step 434 on the processor. Typically though not necessarily the saturation profile comparer includes executable instructions. However, other arrangements may be equally suitable, including but not limited to a saturation response executor that includes independent dedicated hardware (though in such instances the saturation profile comparer may be placed in communication with the processor rather than being instantiated thereon). Comparison of a sensor feed with a saturation profile has been previously described herein.

Typically though not necessarily the saturation profile, saturation response, comparer, and executor as referenced with respect to FIG. 4 may be instantiated onto the processor from a data store such as a hard drive or solid state drive, or received by communication such as from an external device or network. The present embodiment is not particularly limited with regard to how the saturation profile, saturation response, comparer, and executor are instantiated, or the source(s) from which the saturation profile, saturation response, comparer, and executor are instantiated.

Figure 5:
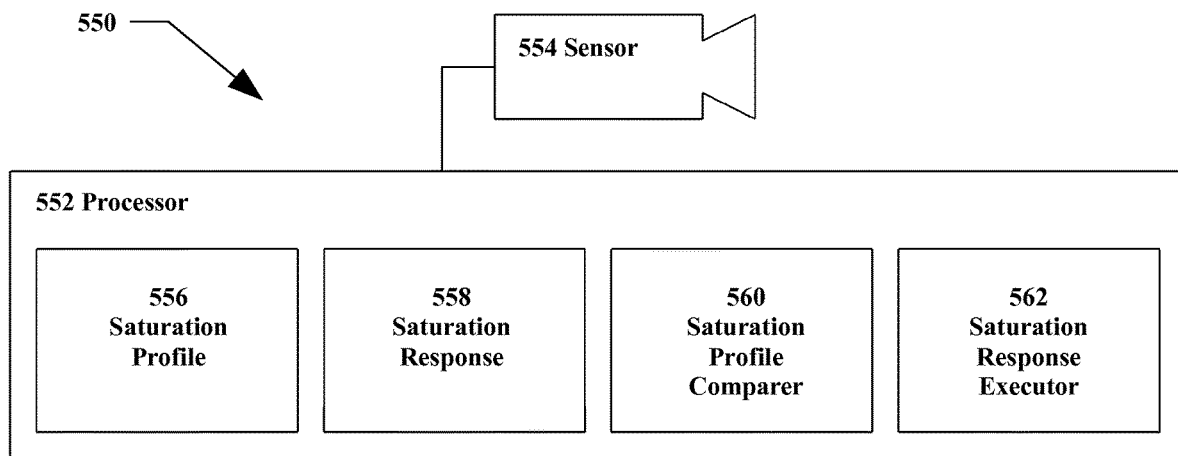
FIG. 5 shows an example apparatus for delivering input to a system according to the present embodiment, in schematic form.

Now with reference to FIG. 5, therein is shown an example embodiment of an apparatus 550 according to the present embodiment, in schematic form. The apparatus 550 includes a processor 552 and a sensor 554 in communication therewith. Although the apparatus 550 depends to some extent on sensor input, the sensor 554 itself need not necessarily be physically part of the apparatus, nor in direct communication with the processor 552, so long as a sensor input therefrom is available to the processor 552. Thus a remote sensor, data recorded at some other time by a sensor, etc. may be equally suitable, though for simplicity a sensor 554 is shown in FIG. 5 as part of the apparatus 550 proper.

The apparatus 550 also includes a saturation profile 556, a saturation response 558, a saturation profile comparer 560, and a saturation response executor 562 instantiated thereon. A saturation profile 556, saturation response 558, saturation profile comparer 560, and saturation response executor 562 according to the present embodiment have been described previously herein.

Figure 6:
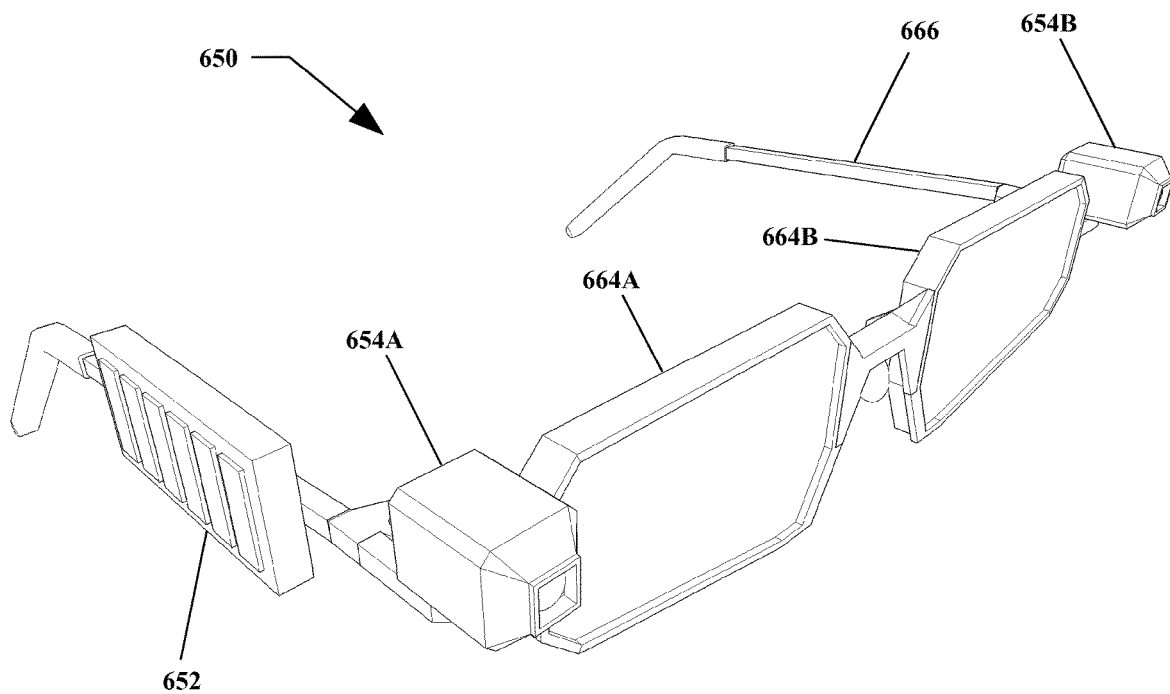
FIG. 6 shows an example apparatus for delivering input to a system according to the present embodiment, in perspective view.

The present embodiment may be used with and/or incorporated into a wide variety of other devices, and may take a wide variety of forms. As noted previously, one such form may include a head-mounted display (though the present embodiment is not limited thereto). Now with reference to FIG. 6, an example of an apparatus 650 of the present embodiment in the form of such a head-mounted display is depicted therein. The example embodiment as shown in FIG. 6 includes a processor 652. Although not visible in FIG. 6, a saturation profile, saturation response, saturation profile comparer, and saturation response executor may be instantiated on the processor 652. The apparatus 650 also includes first and second sensors 654A and 654B. In addition, the apparatus 650 includes a body 666 with the processor 652 and the first and second sensors 654A and 654B disposed thereon, the body 666 having the form of a pair of glasses. In the example arrangement shown, the first and second sensors 654A and 654B are shown facing outward, slightly to either side of where a wearer's eyes would be located if the apparatus 650 were worn, and facing such that the fields of view of the first and second sensors 654A and 654B may correspond at least approximately with the fields of view of the wearer's eyes. However, this is an example only, and other arrangements may be equally suitable.

In addition, the apparatus 650 as shown in FIG. 6 includes first and second displays 664A and 664B, with the first and second displays 664A and 664B disposed on the body 666 so as to be in front of and proximate a wearer's eyes when the apparatus 650 is worn. Though not required for the present embodiment, for an arrangement wherein the present embodiment is incorporated into a head-mounted display as shown in the example of FIG. 6 such displays may be useful. It is noted that the first and second displays 664A and 664B also may be taken as an example of additional features that may be incorporated with but that may not be required by the present embodiment; a wide variety of such features may be suitable for use with the present embodiment, and it is emphasized that the present embodiment is not limited only to the specific elements shown and described herein.

Figure 7:
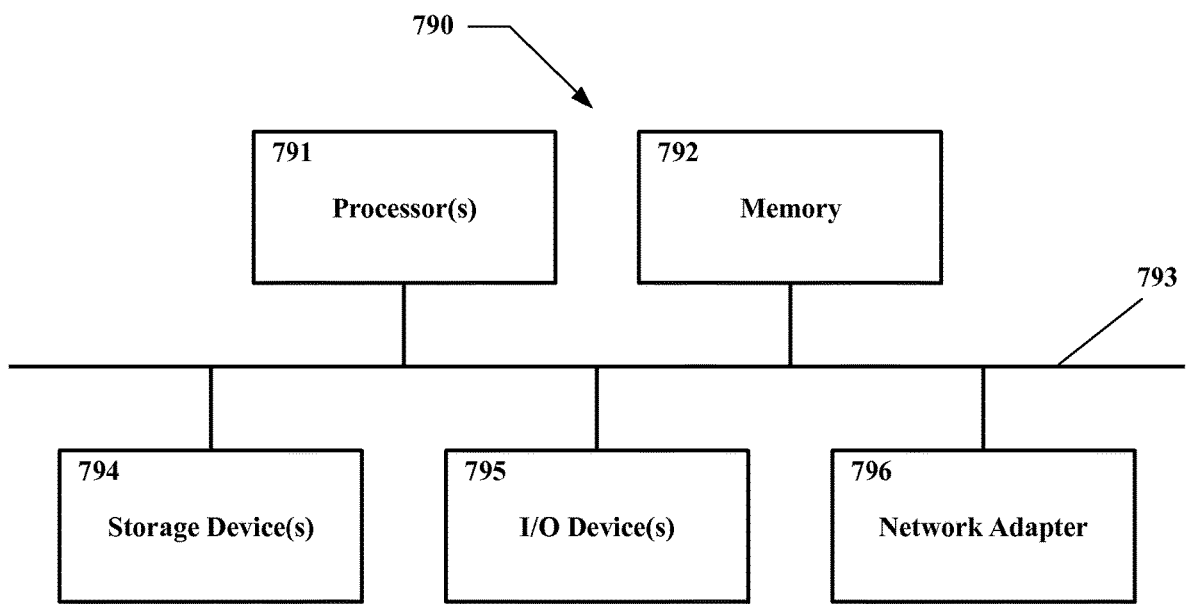
FIG. 7 shows a block diagram of a processing system that may implement operations of the present embodiment.

FIG. 7 is a block diagram of an apparatus that may perform various operations, and store various information generated and/or used by such operations, according to an embodiment of the disclosed technique. The apparatus may represent any computer or processing system described herein. The processing system 790 is a hardware device on which any of the other entities, components, or services depicted in the examples of FIG. 1 through FIG. 6 (and any other components described in this specification) may be implemented. The processing system 790 includes one or more processors 791 and memory 792 coupled to an interconnect 793. The interconnect 793 is shown in FIG. 7 as an abstraction that represents any one or more separate physical buses, point to point connections, or both connected by appropriate bridges, adapters, or controllers. The interconnect 793, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 791 is/are the central processing unit of the processing system 790 and, thus, control the overall operation of the processing system 790. In certain embodiments, the processor(s) 791 accomplish this by executing software or firmware stored in memory 792. The processor(s) 791 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 792 is or includes the main memory of the processing system 790. The memory 792 represents any form of random access memory (RAM), read-only memory (ROM), flash memory, or the like, or a combination of such devices. In use, the memory 792 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 794, a storage device(s) 795, and I/O device(s) 796, are also connected to the processor(s) 791 through the interconnect 793. The network adapter 794 provides the processing system 2090 with the ability to communicate with remote devices over a network and may be, for example, an Ethernet adapter or Fiber Channel adapter. The network adapter 794 may also provide the processing system 790 with the ability to communicate with other computers within the cluster. In some embodiments, the processing system 790 may use more than one network adapter to deal with the communications within and outside of the cluster separately.

The I/O device(s) 796 can include, for example, a keyboard, a mouse or other pointing device, disk drives, printers, a scanner, and other input and/or output devices, including a display device. The I/O device(s) 796 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head-mounted displays or other wearable devices.

The code stored in memory 792 may be implemented as software and/or firmware to program the processor(s) 791 to carry out actions described herein. In certain embodiments, such software or firmware may be initially provided to the processing system 790 by downloading from a remote system through the processing system 790 (e.g., via network adapter 794).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 795 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the embodiment. Since many embodiments of the embodiment can be made without departing from the spirit and scope of the embodiment, the embodiment resides in the claims hereinafter appended.

The invention claimed is:

1. A method, comprising:
    defining, by a processing device, one or more actions to be carried out when a saturation determination is positive, wherein the one or more actions comprise:
        navigating a user interface;
        transmitting data by the processing device;
        sending instructions to another device in communication with the processing device; or
        executing another function by the processing device;
    sensing, by a sensor, an object that occupies a first portion of a field of view (FOV) of the sensor at a first point in time;
    determining, by a processing device, a first saturation level of the object at the first portion of the FOV;
    sensing, by the sensor, the object that occupies a second portion of the FOV of the sensor at a second point in time;
    determining, by the processing device, a second saturation level of the object at the second portion of the FOV;
    determining, by the processing device, that the first saturation level is different than the second saturation level, wherein a difference between the first saturation level and the second saturation level is a positive saturation determination; and
    in response to the positive saturation determination, executing the one or more actions by the processing device.

2. The method of claim 1, wherein the object sensed in the first portion of the FOV is shown in a portion of an image or a video.

3. The method of claim 2, wherein at least one of the first saturation level or the second saturation level is at least one of a maximum brightness level of the image or the video, a minimum brightness level of the image or the video, a maximum color channel brightness level of the image or the video, a minimum color channel brightness level of the image or the video, a substantially uninformatively uniform brightness level of the image or the video, a substantially uninformatively uniform color channel brightness level of the image or the video, an invalid brightness level of the image or the video, an invalid color brightness level of the image or the video, an error brightness level of the image or the video, or an error color brightness level of the image or the video.

4. The method of claim 1, wherein a first amount of space the object that occupies in the first portion of the FOV is less than a second amount of space the object that occupies in the second portion of the FOV.

5. The method of claim 1, wherein:
the object is a hand; and
the hand occupies a first amount of space in the first portion of the FOV that is less than a second amount of space that the hand occupies in the second portion of the FOV.

6. The method of claim 1, wherein the object that occupies the first portion of the FOV of the sensor at the first point in time is an image of a hand covering a portion of the FOV of the sensor.

7. The method of claim 1, wherein:
the object that occupies the first portion of the FOV of the sensor at the first point in time is an image that includes a portion of a hand and a portion of an environment approximate the hand; and
the portion of the hand covers a portion of the FOV of the sensor at the first point in time.

8. The method of claim 1, wherein the object that occupies the second portion of the FOV of the sensor at the first point in time is an image of a hand covering a portion of the FOV of the sensor.

9. The method of claim 1, wherein:
the processing device is part of a head-mounted wearable device; and
the sensor is connected to the head-mounted wearable device such that the sensor is positioned approximate to an eye of a user of the head-mounted wearable device.

10. The method of claim 1, wherein when the first saturation level is different than the second saturation level, the second saturation level is greater than the first saturation level.

11. The method of claim 1, wherein a combination of the object occupying the first portion of the FOV at the first point in time and the object occupying the second portion of the FOV at the second point in time is a hand gesture of a user.

12. The method of claim 11, wherein when the hand gesture terminates, the second saturation level is in a complete saturation of the FOV of the sensor.

13. The method of claim 1, wherein:
the object is located at a first distance from the sensor at the first point in time; and
the object is located at a second distance from the sensor at the second point in time, wherein the first distance is different than the second distance.

14. A device, comprising:
a sensor configured to:
sense a first saturation level of an object at a first point in time; and
sense a second saturation level of the object at a second point in time;
a saturation profile that is retrievable from a memory;
a saturation response that is retrievable from the memory, wherein the saturation response comprises:
navigating a user interface;
transmitting data;
sending instructions to another device; or
executing another processing function;
a processing device coupled to the sensor and the memory, wherein the processing device is configured to:
determine that the object occupies a first portion of a field of view (FOV) of the sensor at the first point in time based on the first saturation level based on the retrieved saturation profile, wherein the object occupying the first portion of the FOV is indicative of the object being a first distance from the sensor;
determine that the object occupies a second portion of the FOV at the second point in time based on the second saturation level based on the retrieved saturation profile, wherein the object occupying the second portion of the FOV is indicative of the object being a second distance from the sensor; and
in response to the object being at the first distance at the first point in time and the second distance at the second point in time, execute the saturation response, wherein the saturation response is associated with the first saturation level and the second saturation level.

15. The device of claim 14, wherein when the object occupies the second portion of the FOV at the second point in time, the sensor is substantially saturated such that the sensor is blacked out by the object.

16. The device of claim 14, wherein the object moving from the first distance at the first point in time to the second distance at the second point in time is indicative of the object moving towards the sensor.

17. An apparatus, comprising:
a sensor configured to:
sense a movement of an object; and
sense a saturation level of the object;
a saturation profile that is retrievable from a memory;
a saturation response that is retrievable from the memory, wherein the saturation response comprises:
navigating a user interface;
transmitting data;
sending instructions to another device; or
executing another processing function; and
a processing device coupled to the sensor and the memory, wherein the processing device is configured to:
determine that the movement of the object matches a defined movement for a gesture;
determine the saturation level exceeds a threshold saturation level based on the retrieved saturation profile; and
in response to the movement of the object matching the defined movement for the gesture and the saturation level exceeding the threshold saturation level, execute the saturation response, wherein the saturation response is associated with the gesture and threshold saturation level.

18. The apparatus of claim 17, wherein the object is a portion of an image or a video.

19. The apparatus of claim 17, wherein:
the sensor is a thermal sensor; and
the saturation level is indicative of a thermal temperature of the object.

20. The apparatus of claim 17, the processing device is configured to execute the executable command when the saturation level of the object exceeds the threshold saturation level at a first point in time and the movement of the object matching the defined movement for the gesture at a second point in time.

* * * * *